US006693768B1

United States Patent
Crue et al.

(10) Patent No.: US 6,693,768 B1
(45) Date of Patent: Feb. 17, 2004

(54) PERPENDICULAR MAGNETIC RECORDING HEAD HAVING A FLUX FOCUSING MAIN POLE

(75) Inventors: Billy Wayne Crue, Pittsburgh, PA (US); Sakhrat Khizroev, Pittsburgh, PA (US); Dmitri Litvinov, Pittsburgh, PA (US); Thomas McLendon Crawford, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 255 days.

(21) Appl. No.: 09/809,118

(22) Filed: Mar. 15, 2001

Related U.S. Application Data
(60) Provisional application No. 60/189,359, filed on Mar. 15, 2000.

(51) Int. Cl.[7] ............................................... G11B 5/147
(52) U.S. Cl. ....................................................... 360/126
(58) Field of Search ........................................ 360/126

(56) References Cited

U.S. PATENT DOCUMENTS

| | | |
|---|---|---|
| 2,927,163 A | 3/1960 | Brower |
| 3,805,291 A | 4/1974 | Sakurai |
| 3,813,766 A | 6/1974 | Brock et al. |
| 4,001,890 A | 1/1977 | Kayser |
| 4,078,300 A | 3/1978 | Lazzari |
| 4,138,702 A | 2/1979 | Magnenet |
| 4,219,855 A | 8/1980 | Jones, Jr. |
| 4,404,609 A | 9/1983 | Jones, Jr. |
| 4,423,450 A | 12/1983 | Hamilton |
| 4,438,471 A | 3/1984 | Oshiki et al. |
| 4,441,131 A | 4/1984 | Osanai |
| 4,541,026 A | 9/1985 | Bonin et al. |
| 4,546,398 A | 10/1985 | Toda et al. |
| 4,575,777 A | 3/1986 | Hosokawa |

(List continued on next page.)

FOREIGN PATENT DOCUMENTS

| | | |
|---|---|---|
| GB | 1344890 | 1/1974 |
| JP | 56087218 | 7/1981 |
| JP | 59195311 | 11/1984 |
| JP | 59231720 | 12/1984 |
| JP | 2001-148107 A | 5/2001 |

OTHER PUBLICATIONS

U.S. patent application Ser. No. 09/695,679, Khizroev et al., filed Oct. 24, 2000.
U.S. patent application Ser. No. 09/726,157, Litvinov et al., filed Nov. 29, 2000.
S. K. Khizroev et al., "Considerations in the Design of Probe Heads for 100 Gbit/in$_2$ Recording Density", *IEEE Transaction of Magnetics*, vol. 3, No. 5, Sep. 1997, pp. 2893–2895.
J. W. Toigo, "Avoiding A Data Crunch", *Scientific American*, May 2000, pp. 58–61, 64–67, 70–74.

*Primary Examiner*—William Korzuch
*Assistant Examiner*—Mark Blouin
(74) *Attorney, Agent, or Firm*—Alan G. Towner, Esq.; Pietragallo, Bosick & Gordon

(57) ABSTRACT

A perpendicular recording head for use with magnetic storage media includes a flux focusing main pole. The main pole includes a layer of material having a high magnetic moment, and a second layer of material having a low magnetic moment. The low moment material is tapered towards the main pole's tip, so that all magnetic flux is channeled into the high moment material before writing to the magnetic storage medium.

15 Claims, 13 Drawing Sheets

U.S. PATENT DOCUMENTS

| | | |
|---|---|---|
| 4,613,918 A | 9/1986 | Kanai et al. |
| 4,631,612 A | 12/1986 | Shiiki et al. |
| 4,639,810 A | 1/1987 | Sakai |
| 4,649,449 A | 3/1987 | Sawada et al. |
| 4,652,956 A | 3/1987 | Schewe |
| 4,672,494 A | 6/1987 | Furuya et al. |
| 4,703,382 A | 10/1987 | Schewe et al. |
| 4,731,157 A | 3/1988 | Lazzari |
| 4,742,413 A | 5/1988 | Schewe |
| 4,763,215 A | 8/1988 | Gueugnon et al. |
| 4,839,761 A | 6/1989 | Gatzen |
| 4,860,139 A | 8/1989 | Hamilton |
| 4,873,599 A | 10/1989 | Sueoka |
| 4,931,886 A | 6/1990 | Mallary |
| 4,943,882 A | 7/1990 | Wada et al. |
| 4,974,110 A | 11/1990 | Kanamine et al. |
| 4,985,792 A | 1/1991 | Moir |
| 5,016,342 A | 5/1991 | Pisharody et al. |
| 5,027,246 A | 6/1991 | Numazawa et al. |
| 5,068,959 A | 12/1991 | Sidman |
| 5,073,836 A | 12/1991 | Gill et al. |
| 5,196,976 A | 3/1993 | Lazzari |
| 5,225,953 A | 7/1993 | Wada et al. |
| 5,241,430 A | 8/1993 | Janz |
| 5,305,516 A | 4/1994 | Imazeki et al. |
| 5,372,698 A | 12/1994 | Liao |
| 5,430,589 A | 7/1995 | Moir et al. |
| 5,606,478 A | 2/1997 | Chen et al. |
| 5,668,689 A | 9/1997 | Schultz et al. |
| 5,687,046 A | 11/1997 | Mathews |
| 5,738,927 A | 4/1998 | Nakamura et al. |
| 5,796,557 A | 8/1998 | Bagnell et al. |
| 5,801,910 A | 9/1998 | Mallary |
| 5,812,350 A | 9/1998 | Chen et al. |
| 5,864,450 A | 1/1999 | Chen et al. |
| 5,920,979 A | 7/1999 | Nepela et al. |
| 5,942,342 A | 8/1999 | Hikosaka et al. |
| 5,991,126 A | 11/1999 | Hayashi et al. |
| 5,995,341 A | 11/1999 | Tanaka et al. |
| 5,995,343 A | 11/1999 | Imamura |
| 5,996,045 A | 11/1999 | Lee et al. |
| 6,063,512 A | 5/2000 | Osaka et al. |
| 6,163,442 A | 12/2000 | Gill et al. |
| 6,259,583 B1 | 7/2001 | Fontana, Jr. et al. |
| 6,317,290 B1 | 11/2001 | Wang et al. |
| 2001/0022712 A1 | 9/2001 | Funayama et al. |
| 2001/0027603 A1 | 10/2001 | Komuro et al. |

PERPENDICULAR MAGNETIC RECORDING HEAD HAVING A FLUX FOCUSING MAIN POLE

CROSS-REFERENCE TO RELATED APPLICATION

This application claims the benefit of U.S. Provisional Patent Application No. 60/189,359, filed Mar. 15, 2000.

BACKGROUND OF THE INVENTION

1. Field of the Invention

The present application relates to perpendicular recording heads for use with magnetic storage media. More specifically, the invention relates to the use of high saturation magnetic moment and low saturation magnetic moment layers within the main pole to produce high recording densities and low manufacturing costs.

2. Description of the Related Art

Recording heads for use with magnetic storage media have typically been of the longitudinal type, utilizing a pair of opposing write poles with their tips in close proximity to each other at the bottom surface of the recording head. The two poles are connected typically at the top by a yoke, typically made of the same ferromagnetic material as the poles. A coil is located in close proximity to one of the two opposing poles. When current passes through the coil, magnetic flux is induced in the yoke which produces a magnetic field with a bubble-like contour, across a gap separating the two poles. A portion of the magnetic flux across the write gap will pass through the magnetic storage medium, thereby causing a change in the magnetic state within the magnetic storage medium where the head field is higher than the media coercive force. The media coercive force is chosen high enough so that only the head fields across a narrow gap of a thin film inductive head, flowing with a slider on a air bearing between the surfaces of the disk and the slider, modify the bits of information on the storage media.

The bits of information are recorded on the disk along concentric tracks that are separated by guard bands. The width of the track plus that of the guard-band in which no information is stored defines the track density. The length of the bit along the track defines the linear density. The total storage capacity is directly proportional to the product of track density and linear density. The increase in linear density also enhances the data transfer rate. The demand for higher storage capacity and higher data rates led to the redesign of various components of disk drives.

The recording densities possible with longitudinal recording are limited to approximately 50 to 100 G bit/inch$^2$, because at higher recording densities, superparamagnetic effects result in magnetic instabilities within the magnetic storage medium.

Perpendicular recording has been proposed to overcome the recording density limitations of longitudinal recording. Perpendicular recording heads for use with magnetic storage media typically include a pair of magnetically coupled poles, consisting of a main write pole having a small bottom surface area, and a flux return pole having a large bottom surface area. A coil is located adjacent to the main write pole, for inducing a magnetic field between that pole and a soft underlayer. The soft underlayer is located below the recording layer of the magnetic storage medium and enhances the amplitude of the field produced by the main pole. This in turn allows the use of media with higher coercive force, consequently, more stable bits can be stored in the media. In the recording process, an electrical current in the coil energizes the main pole, which produces a magnetic field. The image of this field is produced in the soft underlayer, such that about double the field strength is produced in the magnetic media. The flux density that diverges from the tip into the soft underlayer returns to the main pole through the return flux pole. The return pole is located sufficiently far apart from the main pole, such that the soft material of the return pole does not affect the magnetic flux of the main pole, which is directed vertically into the hard layer and soft underlayer. Strong magnetic recording fields permit the use of high anisotropy magnetic recording media. Therefore, significantly higher recording densities may therefore be used before magnetic instabilities become an issue.

Presently available perpendicular recording systems use main write poles having uniform magnetic properties (although some presently available longitudinal write poles include material having a high saturation magnetic moment on the surfaces facing each other). Such write poles are therefore limited by the difficulty in depositing material having a high magnetic moment to form the main write pole. Additionally, presently available write poles lack the ability to generate very localized magnetic recording fields, which are important for minimizing the trackwidth necessary to accommodate the skew angle.

Accordingly, there is a need for a perpendicular recording head having a main write pole made from material having a high magnetic moment, that is also easy to manufacture. Additionally, there is a need for a perpendicular recording head having a main write pole generating a highly localized magnetic recording field.

SUMMARY OF THE INVENTION

The preferred embodiments of the present invention are a perpendicular recording head having a main pole with a layer of high saturation magnetic moment material and a layer of low saturation magnetic moment material. The low moment material is tapered towards the pole tip, so that magnetic flux is focused into the high moment material before writing to the magnetic storage medium.

A typical perpendicular recording head includes a main pole, a flux return pole magnetically coupled to the main pole through a yoke, and an electrically conductive coil adjacent to the main pole. The bottom of the flux return pole will typically have a surface area greatly exceeding the surface area of the main pole's tip. Electric current flowing through the coil creates a magnetic flux through the main pole. The direction of the flux may be reversed by reversing the direction of current through the coil.

A typical magnetic storage medium includes a recording layer having a plurality of magnetically permeable tracks separated by guard bands. A magnetically permeable lower layer, which is magnetically soft relative to the tracks, is located below the recording layer.

The main pole includes a layer of material having a high magnetic moment, and a layer of material having a low magnetic moment. The high moment material may be located adjacent to the yoke, with the low moment material located at the rearmost portion of the main pole. The low moment material is tapered towards the pole tip, so that the pole tip itself includes only high moment material. Manufacturing such a recording head begins by providing a substrate upon which a conventional read element and associated shields, flux return pole, yoke, and coil have been deposited. Photoresist is applied to the surface of the back of the recording head defining the location of the main pole's high moment material. It is very difficult to plate or deposit high thicknesses of high moment material. Therefore, only a thin layer of photoresist is necessary to define the location of the high moment material, corresponding to the low thickness of the high moment material. Therefore, the photoresist may be applied defining a location for the main pole having a very narrow width, while maintaining a low aspect ratio (depth divided by width) in the channel defined by the photoresist, thereby facilitating accurate deposition of the photoresist. The high moment material is then deposited in the channel defined by the photoresist. After performing ion milling to remove any excess high moment material, a bi-layer photoresist is applied to define the shape and location of the low moment material. The use of a bi-layer photoresist permits a "shelf" to be formed within the upper layer of photoresist, thereby defining the taper of the low moment material towards the pole tip as the low moment material is being deposited. Depositing the low moment material and removing the photoresist completes the recording head.

To use the recording head, the recording head (or slider) is separated from the magnetic storage medium by a distance known as the flying height. The magnetic storage medium is moved past the recording head so that the recording head follows the tracks of the magnetic storage medium. Current is passed through the coil to create magnetic flux within the main pole. The combination of low moment and high moment material within the main pole provides a sufficiently thick channel for the magnetic flux to generate a strong magnetic field. The taper of the low moment material near the pole tip will focus this magnetic flux into the high moment material, thereby generating a strong magnetic field within the narrow area defined by the high moment pole tip. This magnetic field will cause the magnetic domains in the tracks to align with the magnetic field of the main pole. Changing the direction of current changes the direction of flux created by the recording head, and therefore changes the magnetic fields within the magnetic storage medium. A binary "0" is recorded by maintaining a constant direction of magnetic flux through the main pole, and a binary "1" is recorded by changing the direction of magnetic flux through the main pole.

The strong magnetic fields provided by this main pole structure permit the use of a magnetic storage media having a high anisotropy, thereby limiting superparamagnetic instabilities at high recording densities. Additionally, a narrow main pole may be defined during manufacture due to the low thickness of material deposited and resulting low aspect ratio of the channel within the photoresist wherein the main pole will be deposited. Lastly, the highly localized magnetic field defined by the small bottom surface area of the high moment material at the pole tip, permits the use of a narrower trackwidth while avoiding problems created by the skew angle, because the trackwidth is required only to accommodate the small bottom surface area of the high moment layer of the write pole.

It is therefore an aspect of the present invention to provide a perpendicular recording head having a main pole with one layer having a high saturation magnetic moment, and a second layer having a low saturation magnetic moment.

It is another aspect of the present invention to provide a perpendicular recording head wherein magnetic flux within the main pole is focused towards a layer having a high saturation magnetic moment at the pole tip.

It is a further aspect of the present invention to provide a perpendicular recording head having a main pole with a narrow width, corresponding to a narrow trackwidth.

It is another aspect of the present invention to provide a main pole for a perpendicular recording head having a sufficiently wide path for a strong magnetic field throughout its body, while focusing this magnetic field onto a narrow bottom surface area at the pole tip.

It is a further aspect of the present invention to minimize the effects of the skew angle upon the necessary trackwidth.

It is another aspect of the present invention to provide a main pole for a perpendicular recording head that is easy and cost-effective to manufacture.

These and other aspects of the present invention will become apparent through the following description and drawings.

BRIEF DESCRIPTION OF THE DRAWINGS

Like reference numbers denote like elements throughout the drawings.

DETAILED DESCRIPTION OF THE PREFERRED EMBODIMENTS

The preferred embodiments of the present invention are perpendicular recording heads for use with magnetic storage media, having a main pole with a first layer made from a first material having a high saturation magnetic moment, and a second layer of a second material having a low saturation magnetic moment. As used herein, perpendicular recording means orienting the magnetic domains within the magnetic storage medium substantially perpendicular to the direction of travel of the recording head. As used herein, recording head is defined as a head or slider capable of performing read and/or write operations, although the present invention is directed primarily towards the write portion of the recording head.

Figure 1:
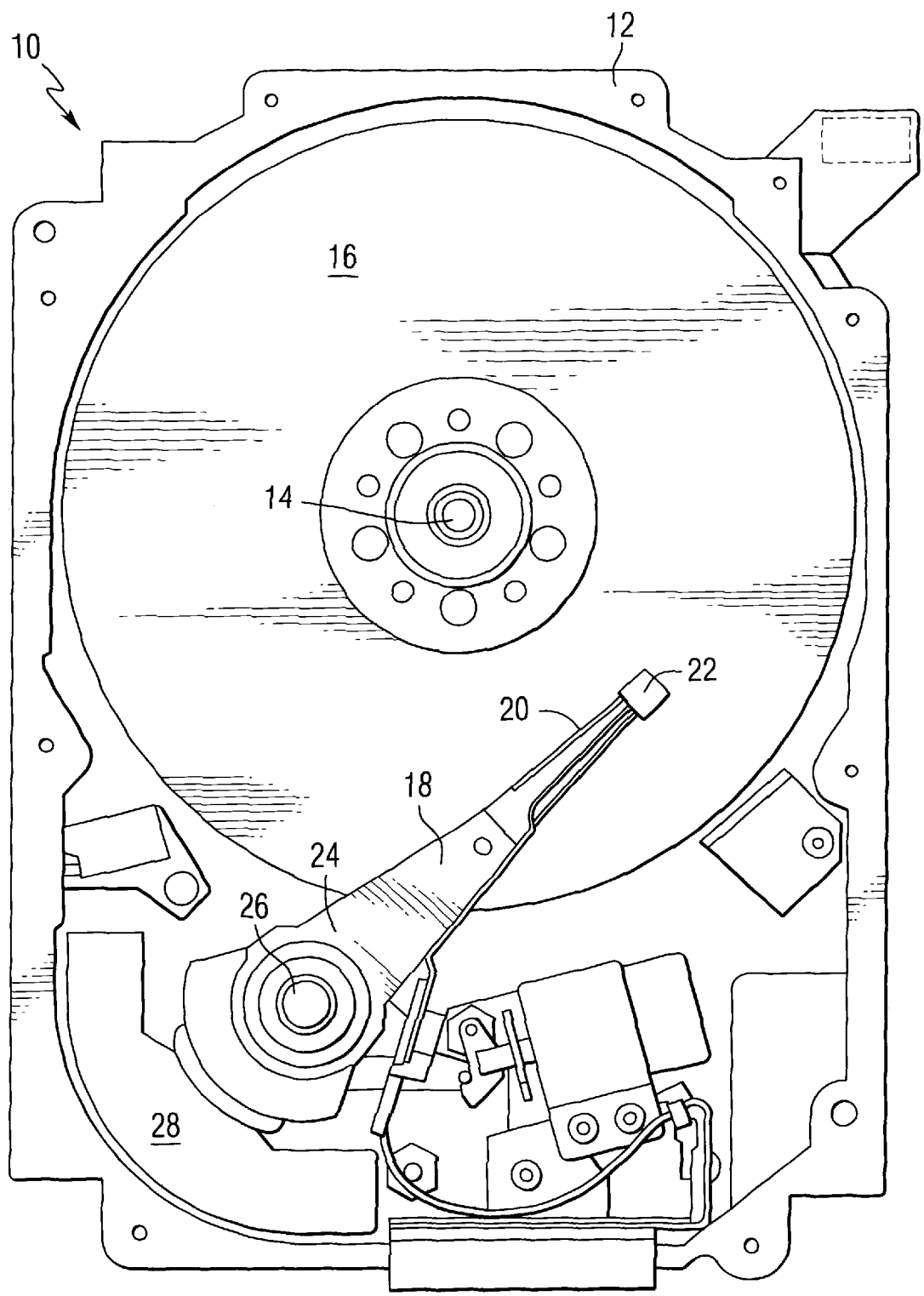
FIG. 1 is a top view of a typical hard disc drive for a computer for which the present invention may be used, illustrating the disc drive with its upper housing portion removed.

The invention will most commonly be used within a fixed disc drive 10 for computers, one of which is illustrated in FIG. 1. The fixed disc drive 10 includes a housing 12 (with the upper portion removed and the lower portion visible in this view for maximum clarity) dimensioned and configured to contain and locate the various components of the disc drive 10. The disc drive 10 includes a spindle motor 14 for rotating at least one magnetic storage medium 16 within the housing, in this case a magnetic disc. At least one arm 18 is contained within the housing 12, with each arm 18 having a first end 20 with a recording head or slider 22, and a second end 24 pivotally mounted to a bearing 26. An actuator motor 28, such as a movable coil DC motor, is located at the arm's second end 24, pivoting the arm 18 to position the head 22 over a desired sector of the disc 16. The actuator motor 28 is regulated by controller which is not shown and which is well known.

Figure 2:
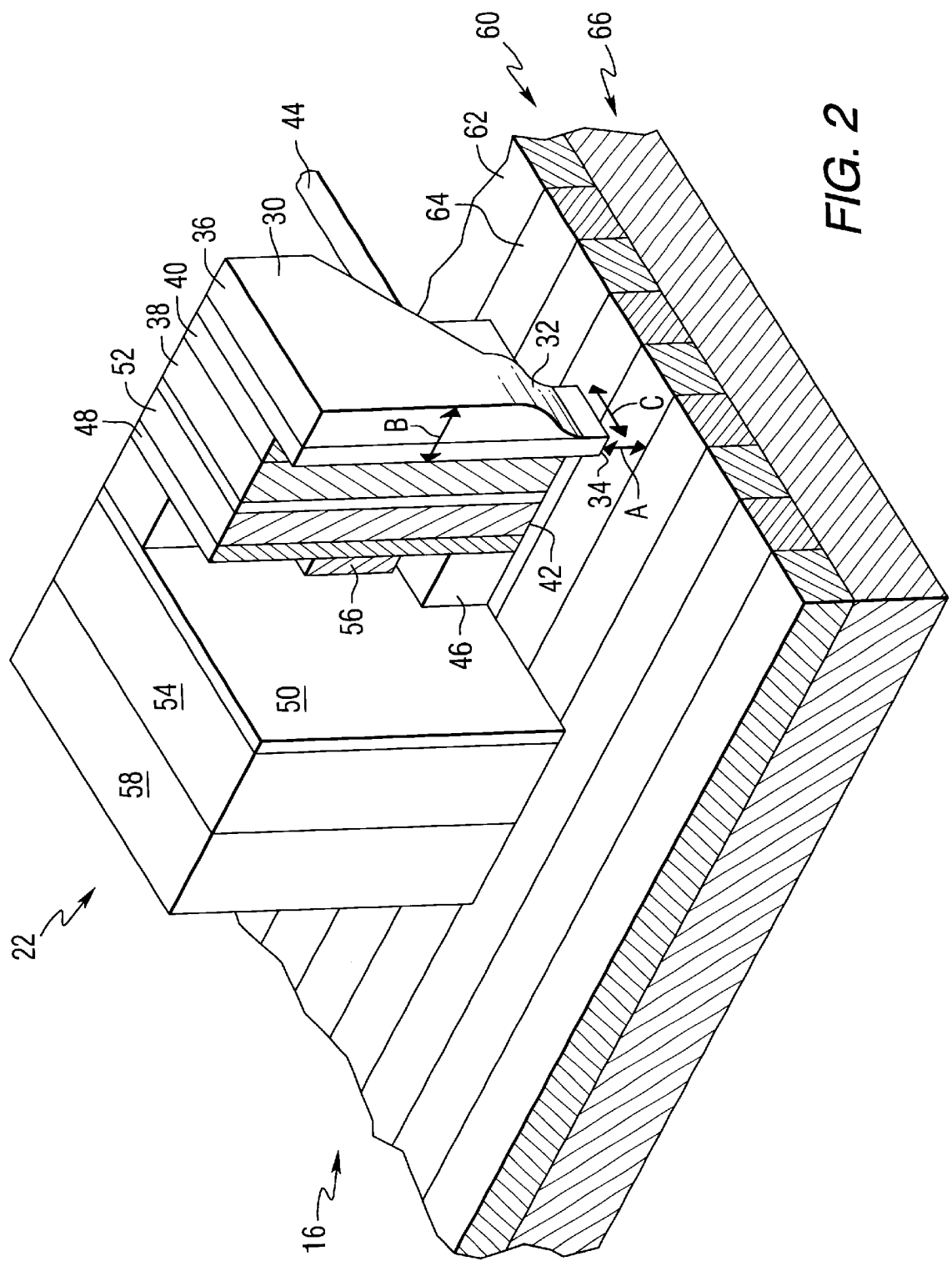
FIG. 2 is a partially sectioned, partially schematic, isometric view of a recording head according to the present invention.
Figure 3:
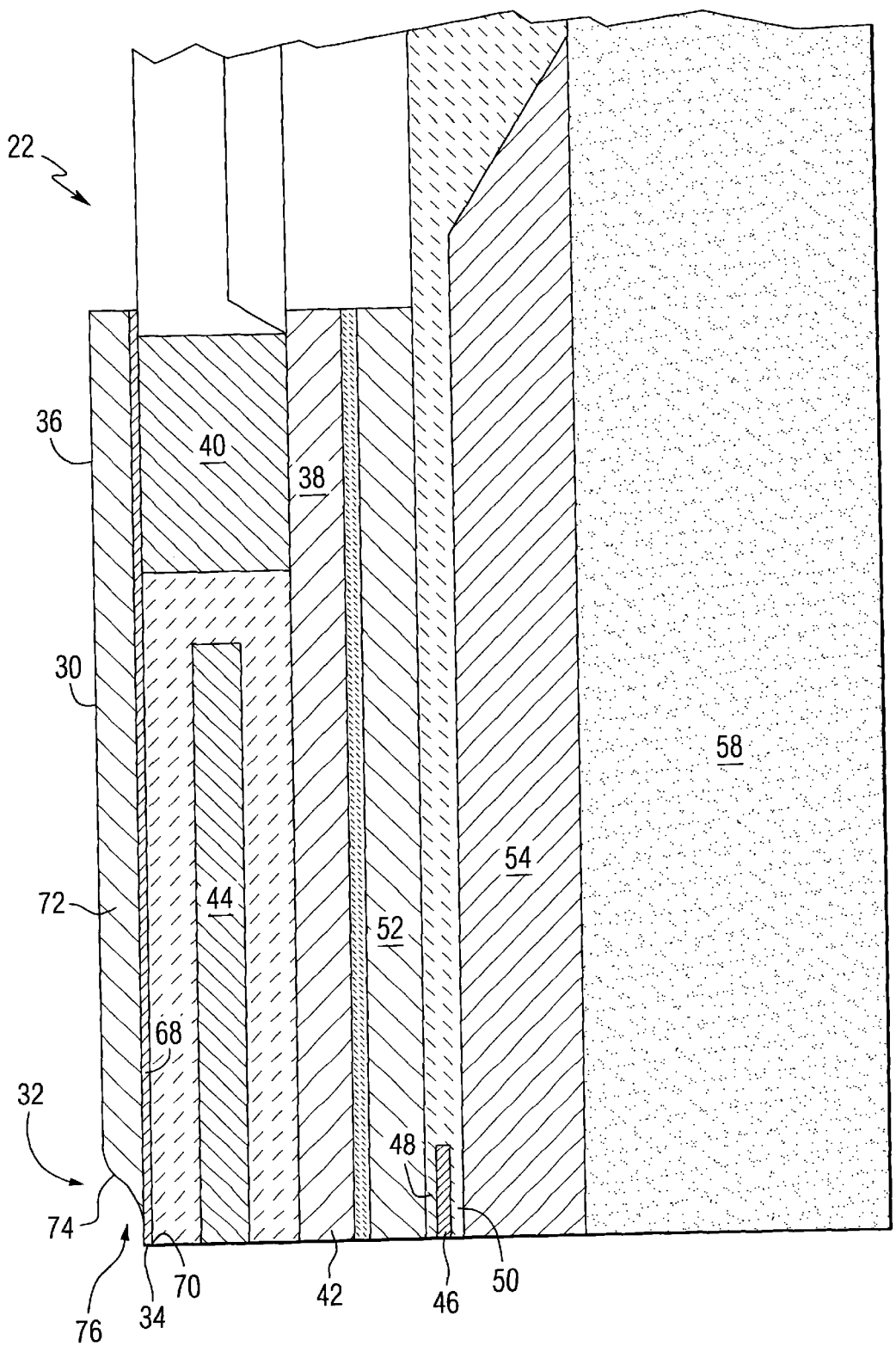
FIG. 3 is a side cross-sectional view of a recording head according to the present invention.
Figure 4:
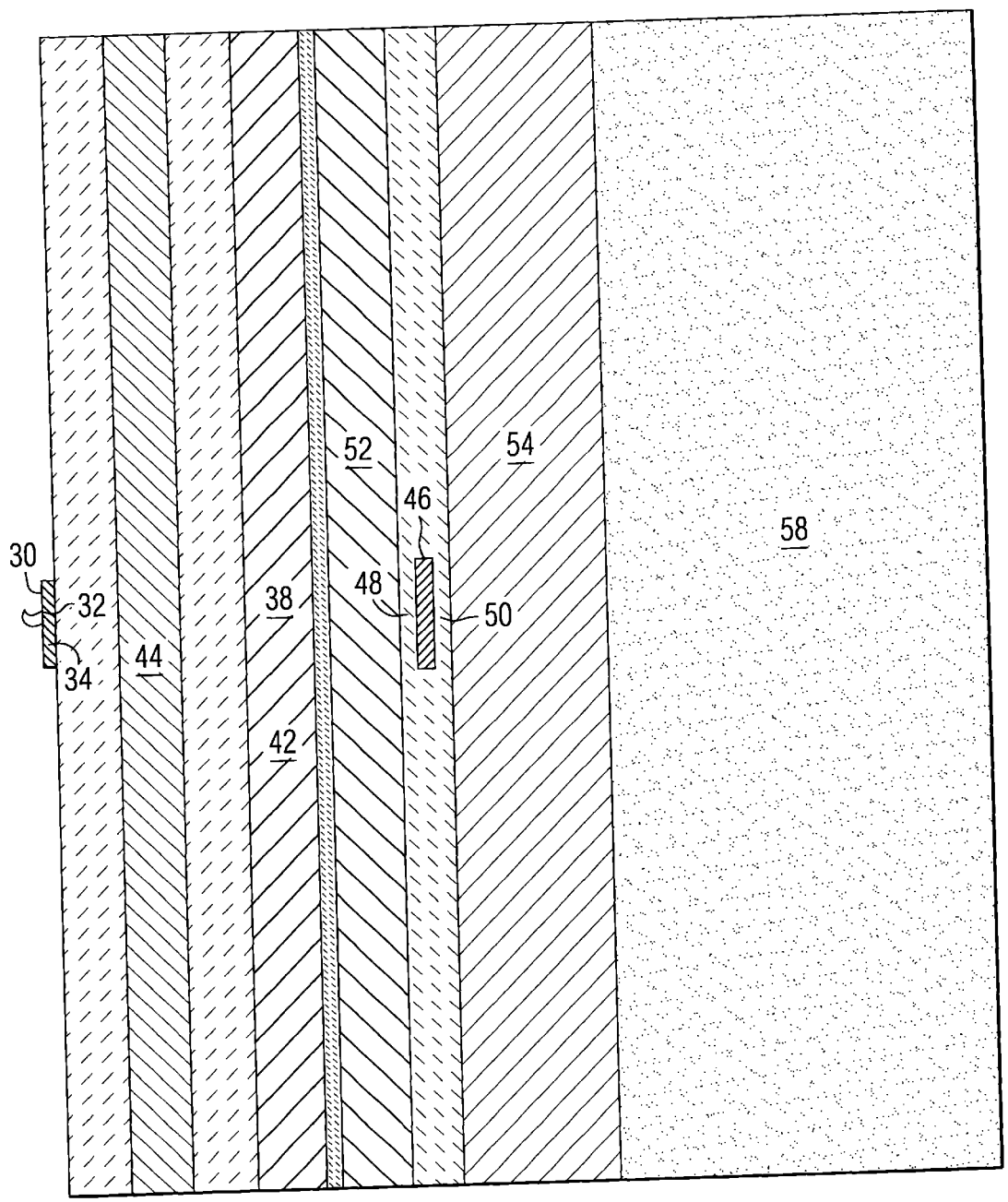
FIG. 4 is a bottom (air-bearing surface) view of a recording head according to the present invention.
Figure 5:
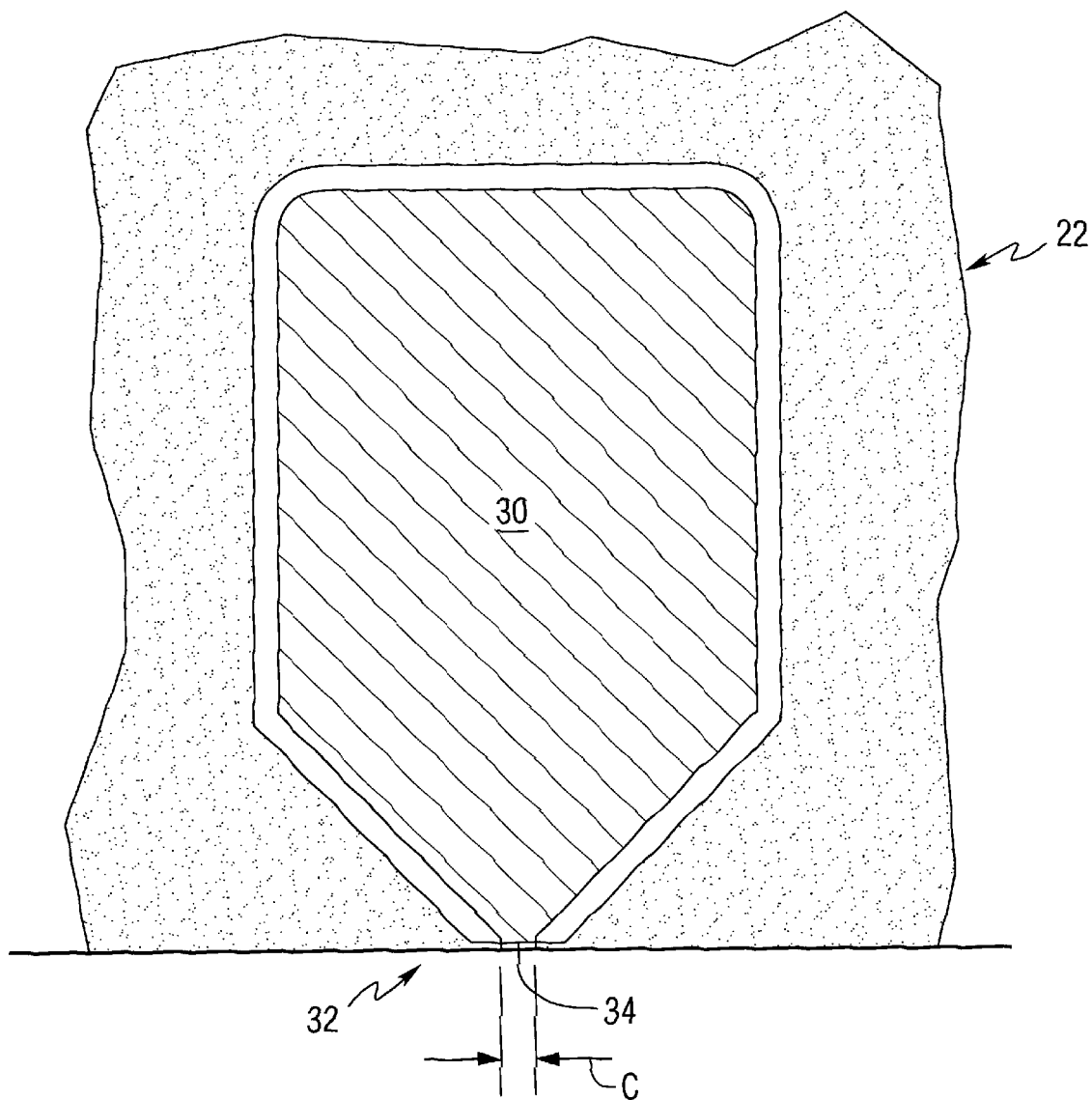
FIG. 5 is a back view of a main pole for a recording head of the present invention.
Figure 6:
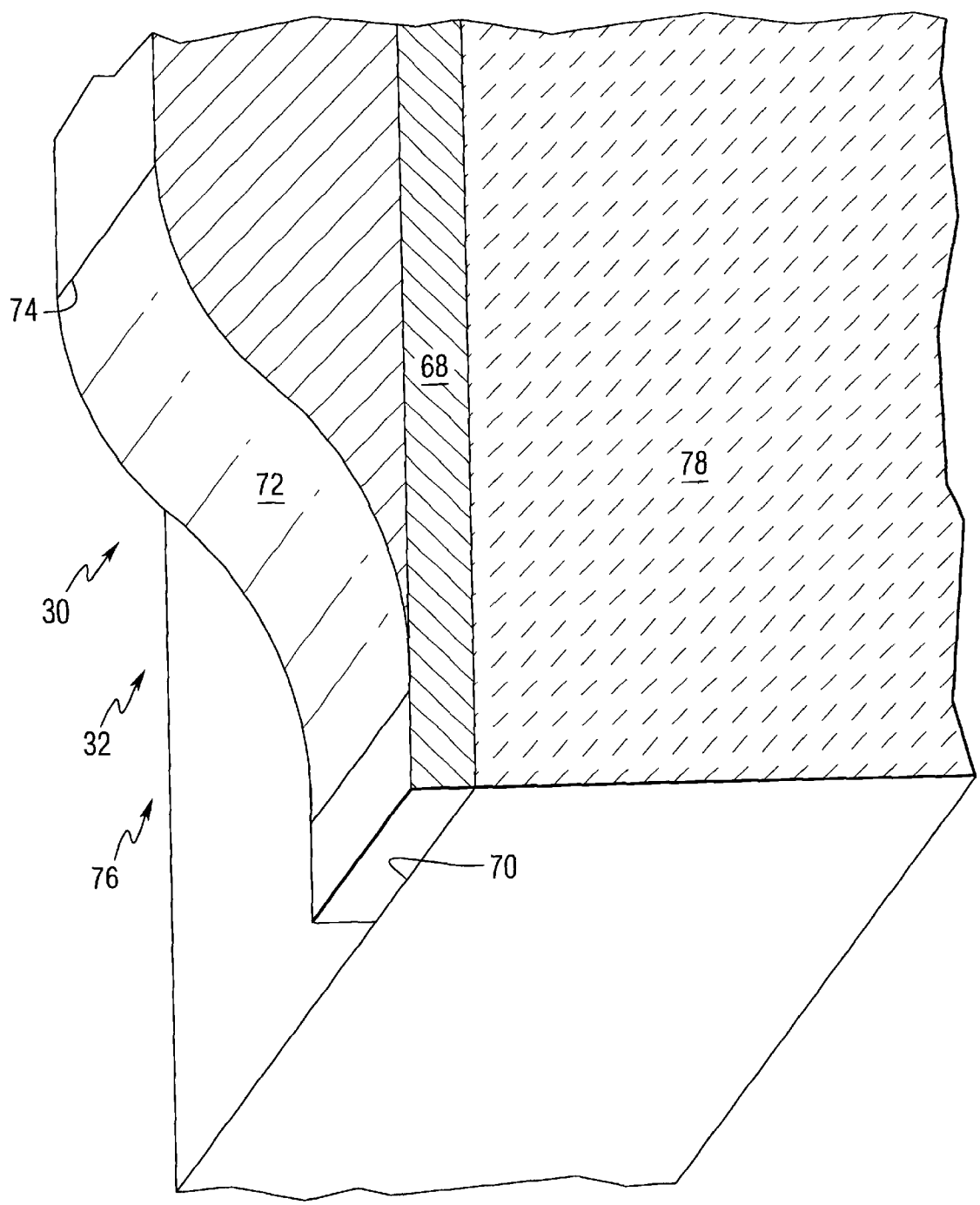
FIG. 6 is an isometric view of the tip of a main pole for a recording head according to the present invention.

Referring to FIGS. 2–4, a recording head 22 of the present invention is illustrated. The recording head 22 includes a magnetically permeable main pole 30, oriented substantially perpendicular to the magnetic storage medium 16, and having a tip 32. The tip 32 includes a bottom surface 34. The top 36 of the main pole 30 is magnetically coupled to a flux return pole 38, possibly through a yoke 40. The flux return pole 38 includes a bottom surface 42, having a substantially larger surface area than the surface 34. An electrically conductive coil 44 is located adjacent to the main pole 30, and is dimensioned and configured to induce a magnetic flux in the main pole 30. The coil 44 is preferably surrounded by insulating material, as is well known in the art.

FIGS. 2–4 also illustrates a read element 46, located between a pair of electrical contacts 48, 50. The read element 46 and electrical contacts 48, 50 are located between a pair of ferromagnetic shields 52, 54. The read element 46 may be any conventional read element, for example, magnetoresistive, giant magnetoresistive, spin valve, or tunnel magnetoresistive. If a giant magnetoresistive read element is selected, a permanent magnet 56 may be located above the read element 46. The entire structure is deposited upon a substrate 58, with an example substrate material being silicon.

FIG. 2 also illustrates a magnetic storage medium 16 for use with a recording head 22. The magnetic storage medium, here a disc, includes a recording layer 60 having a plurality of magnetically permeable tracks 62, which are divided into sectors, with each sector further subdivided into magnetic domains (not shown, but well understood). The tracks 62 are separated by guard bands 64. The disc 16 includes a magnetically permeable lower layer 66, which is magnetically soft relative to the tracks 62. In use, the disc 16 will be separated from the tip 32 of the main pole 30 by a flying height A. The flying height A is sufficiently small so that a high concentration of flux from the main pole 30 will pass through the tracks 62, but sufficiently large to prevent damage to the disc 16 from contact with the recording head 22.

A main pole of the present invention is illustrated in FIGS. 3–6. Whereas prior art main poles are typically made from a single material having a uniform magnetic moment, a main pole 30 of the present invention is made from a first layer of material having a first saturation magnetic moments, and a second layer of material having a second saturation magnetic moment. It is generally desirable to provide a sufficiently thick main pole 30 to provide a sufficient channel for the magnetic flux for a strong magnetic field. As used herein, the thickness, designated by the arrow B in FIG. 2 refers to the dimension of the main pole 30 that is substantially parallel to the track, and the main pole's width, designated by the arrow C in FIG. 2, refers to the dimension of the main pole 30 parallel to the trackwidth. It is also desirable to have a main pole 30 having a high saturation magnetic moment ($M_s$), thereby resulting in a strong magnetic write field. A strong magnetic write field permits use of a magnetic storage medium 16 having a high anisotropy, thereby limiting superparamagnetic instabilities at high recording densities. However, these characteristics must be balanced against the need for having a main pole 30 with a narrow width C, so that a narrow trackwidth is possible, and having a main pole 30 with minimized width C and thickness B, so that problems created by the skew angle are minimized. It is well known that the skew angle is the angle between the recording head 22, and the track 62 over which the recording head 22 is performing a read or write operation, caused by the pivoting of the arm 18 on the bearing 26 to align the recording head 22 with the appropriate track 62. The trackwidth must be selected not only to accommodate the main pole 30 and read element 46 when they are aligned parallel to the track 62, but also when they are aligned at any angle within the possible range of skew angles for the particular disc drive 10 for which they are used. Additionally, it is very difficult to deposit a sufficient thickness of material having a high saturation magnetic moment to form an appropriately dimensioned main pole 30. As is well known, saturation magnetic moment is related to saturation magnetic field according to the equation $B_s=4\pi M_s$, where $B_s$ is the saturation magnetic field, and $M_s$ is the saturation magnetic moment. Referring back to the example of the main pole 30 illustrated in FIGS. 3–6, the first layer 68 of the main pole 30, in this example located adjacent to the yoke 40, and/or adjacent to an edge of the main pole 30, for example, the leading edge 70, is made from material having a high saturation magnetic moment. The second layer 72 of main pole 30, located opposite the yoke 40 and/or adjacent to an edge of the main pole 30, for example, the trailing edge 74, is made from material having a low saturation magnetic moment. The second layer 72 is tapered at the tip 32, gradually decreasing in thickness as the bottom surface 34 is approached, so that the bottom surface 34 of the main pole 30 includes only the first layer 68. Therefore, a sufficient thickness of low moment material can be deposited forming a portion of the main pole 30 to provide a suitably thick channel for a strong magnetic field. At the same time, a high moment material within the first layer 68 provides a strong, localized magnetic field, which is focused by the tapered portion 76 of the second layer at the main pole's tip 32. Examples of material that may be used to form the first layer 68 include FeAlN alloys, FeTaN alloys, CoFe alloys, CoFeNi alloys, and others. FeAlN and FeTaN typically have a $B_s$ of approximately 19 to 20 kG. CoFe typically has a $B_s$ of approximately 25 kG. CoFeNi typically has a $B_s$ equal to approximately 20 kG. Examples of material that may be used to form the second layer 72 include NiFe permalloy alloys, such as NiFe and $Ni_{45}Fe_{55}$, CoZrNb alloys, CoZrTa alloys, and others. Permalloy will typically have a saturation magnetic field ($B_s$) of approximately 10 kG. $Ni_{45}Fe_{55}$ will typically have a $B_s$ of approximately 16 kG. CoZrNb and CoZrTa will typically have a $B_s$ of approximately 12 to 14 kG.

Figure 7:
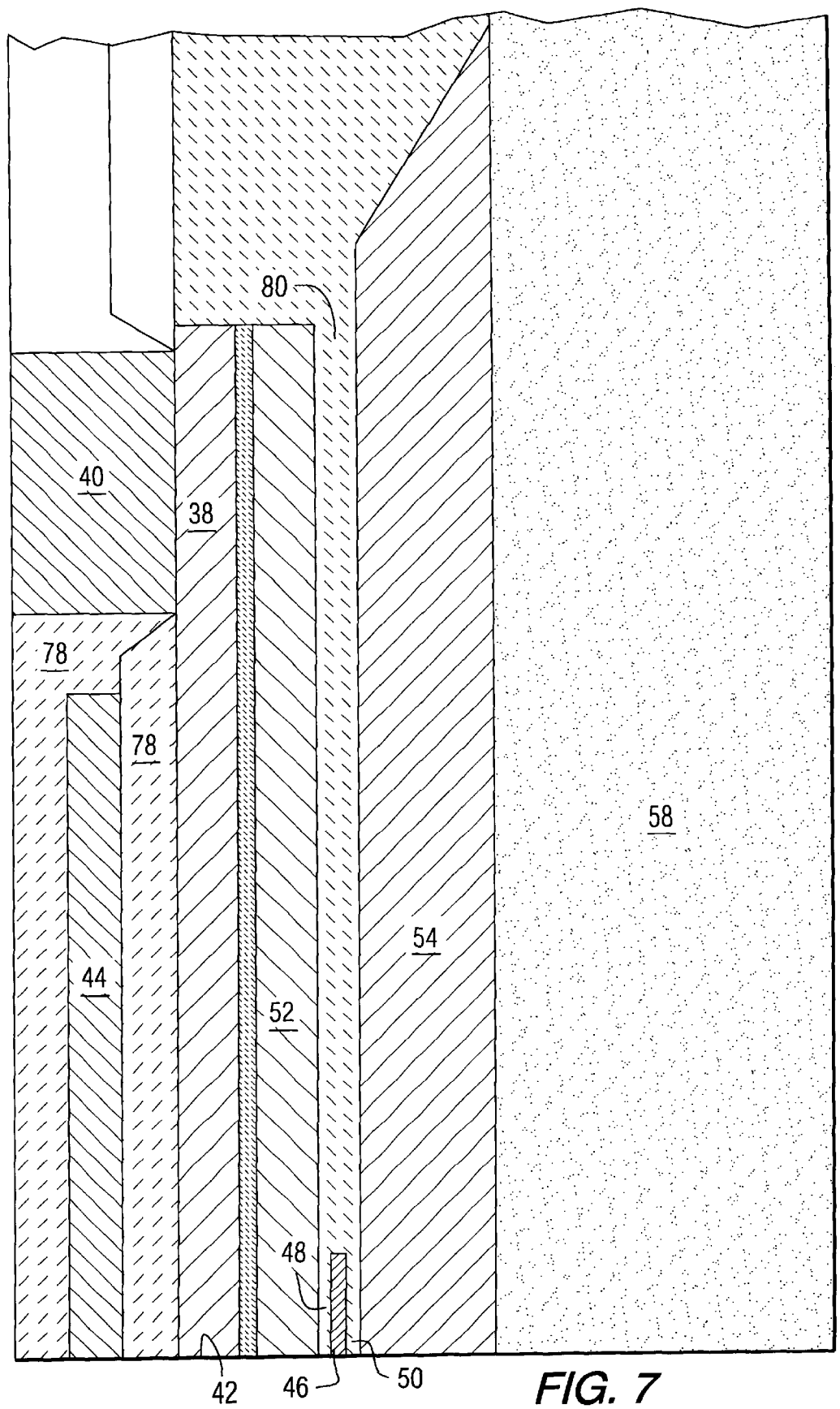
FIG. 7 is a side cross-sectional view of a substrate, read element and associated shields, flux return pole, yoke, and coil for a recording head according to the present invention.
Figure 8:
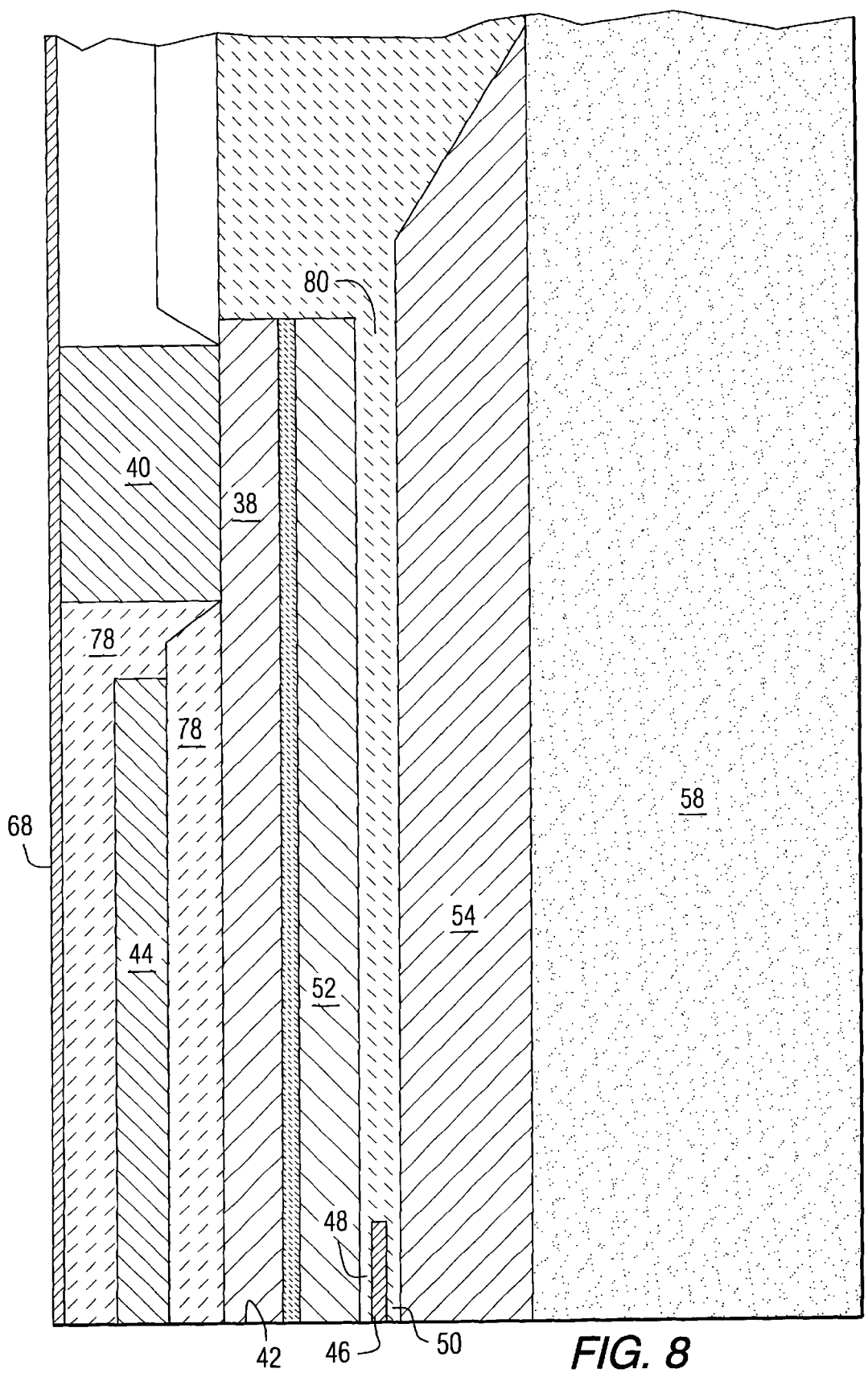
FIG. 8 is a side cross-sectional view of a substrate, read element and associated shields, flux return pole, yoke, coil, and the main pole's high moment layer for a recording head according to the present invention.

A method of manufacturing a recording head 22 of the present invention is illustrated in FIGS. 7–12. Referring to FIG. 7, a substrate 58 has been provided, upon which the read element 46, its associated electrical contacts 48, 50 and magnetic shields 52, 54, the flux return pole 38, the yoke 40, and coil 44 have been deposited. As is well known, the coil 44 is surrounded by insulating material 78, for example, thermally cured photoresist. Additionally, the surface upon which the shield 52 is deposited above the read element 46 and electrical contacts 48, 50 is a gap material 80, for example, alumina. Referring to FIG. 8, the first layer 68 has been deposited upon the surface formed by the yoke 40 and insulation 78. The high moment material may have a thickness ranging from 20 A to 5 μm, and in the present example ranges from approximately 1,000 A to approximately 2,000 A. Because a relatively thin layer 68 of high moment material will typically be deposited, manufacturing a main write pole with a narrow width C is also facilitated. Before depositing the first layer 68, photoresist will be applied to the surfaces of the yoke 40 and insulation 78, with a channel in the photoresist defining the location of the high moment material 68. Photoresist is applied to this surface by a conventional process known as spinning. When defining a channel within the photoresist within which material will be deposited, it is easiest to form a channel having a low aspect ratio (depth divided by width) than it is to form a channel having a high aspect ratio. Therefore, the relatively low thickness of the first layer 68 permits a channel with a narrow width, which will ultimately correspond to the main pole's width C, to be formed while maintaining a low aspect ratio. Therefore, it is possible to provide main pole widths, and therefore trackwidths, of less than 0.10 μm, and possibly as low as approximately 0.03 μm.

Figure 9:
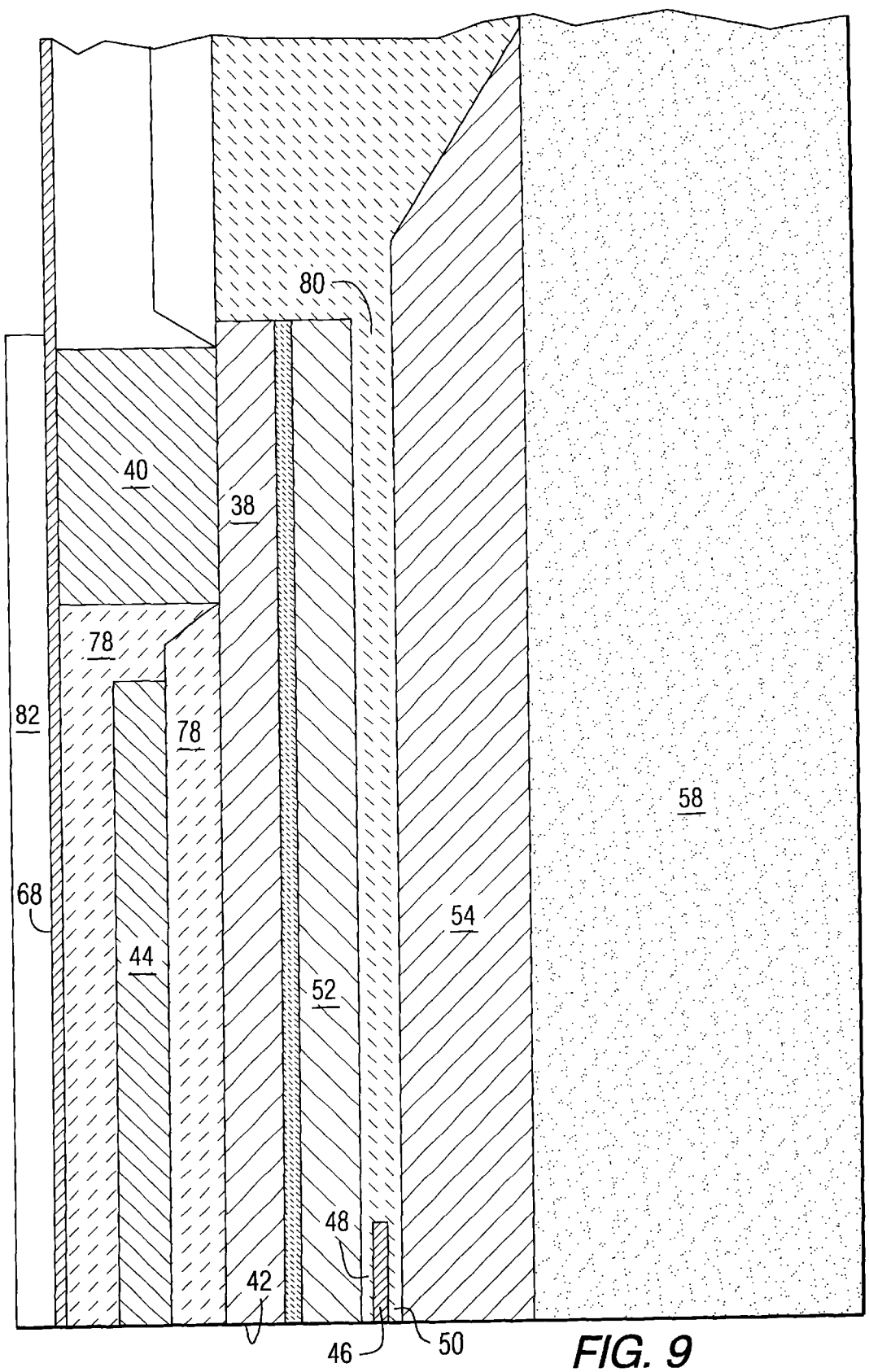
FIG. 9 is a side cross-sectional view of a substrate, read element and associated shields, flux return pole, yoke, coil and main pole high moment layer for a recording head of the present invention, showing photoresist deposited on the desired portion of the high moment layer.
Figure 10:
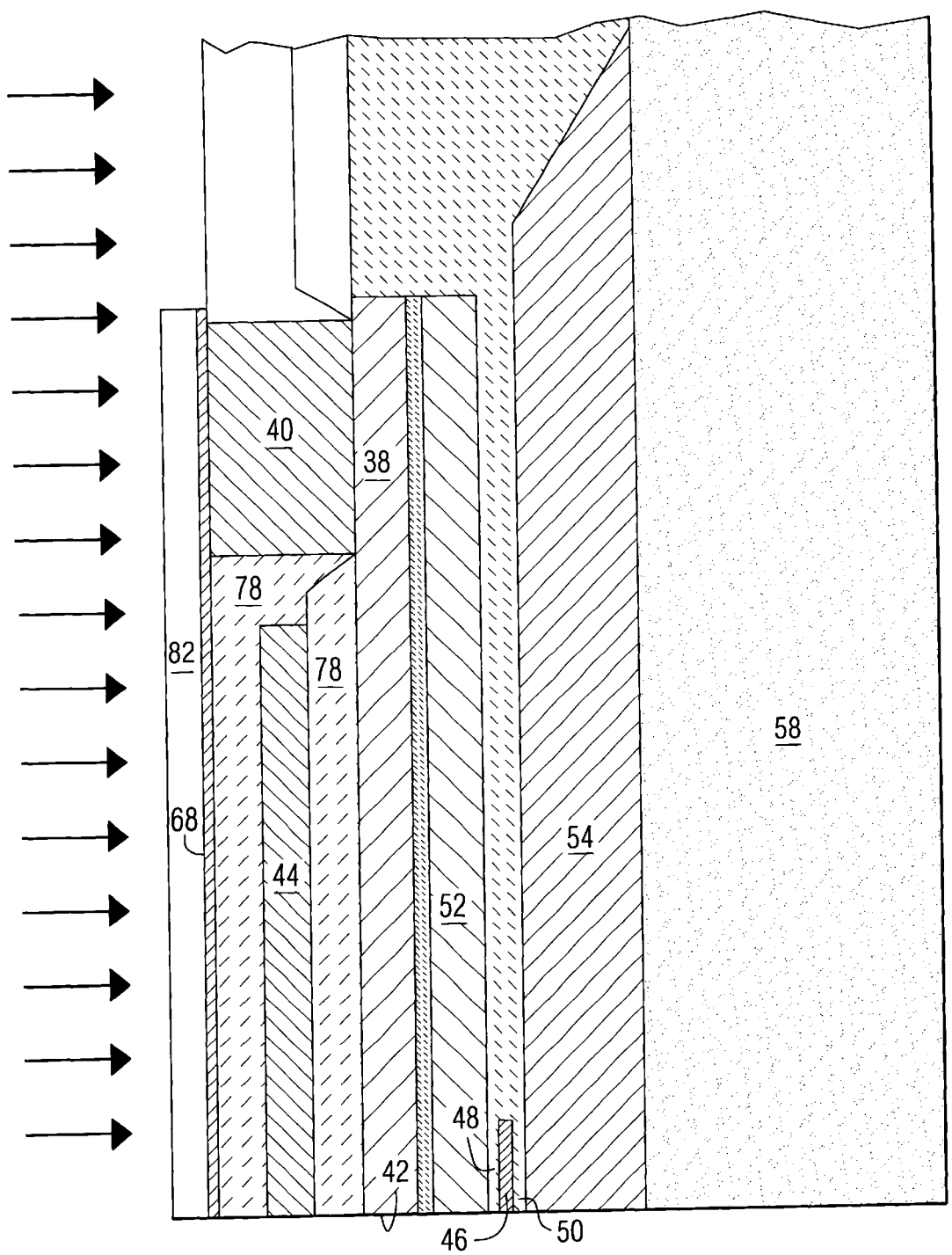
FIG. 10 is a side cross-sectional view of a substrate, read element and associated shields, flux return pole, yoke, coil, and main pole high moment layer for a recording head according to the present invention, illustrating removal of excess high moment material through ion milling.
Figure 11:
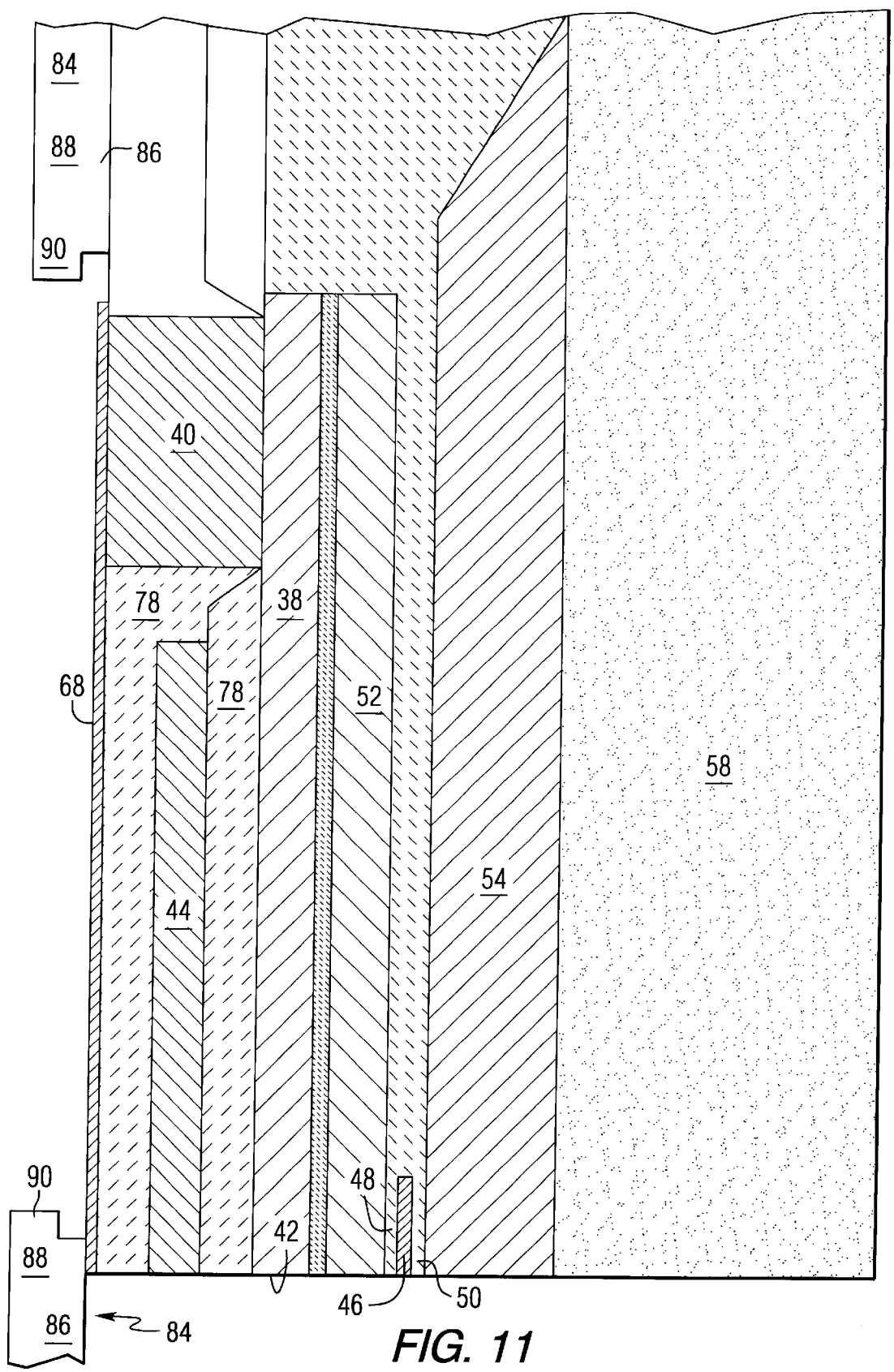
FIG. 11 is a side cross-sectional view of a substrate, read element and associated shields, flux return pole, yoke, coil, and high moment main pole material for a recording head according to the present invention illustrating the bi-layer photoresist used for deposition of low moment material.
Figure 12:
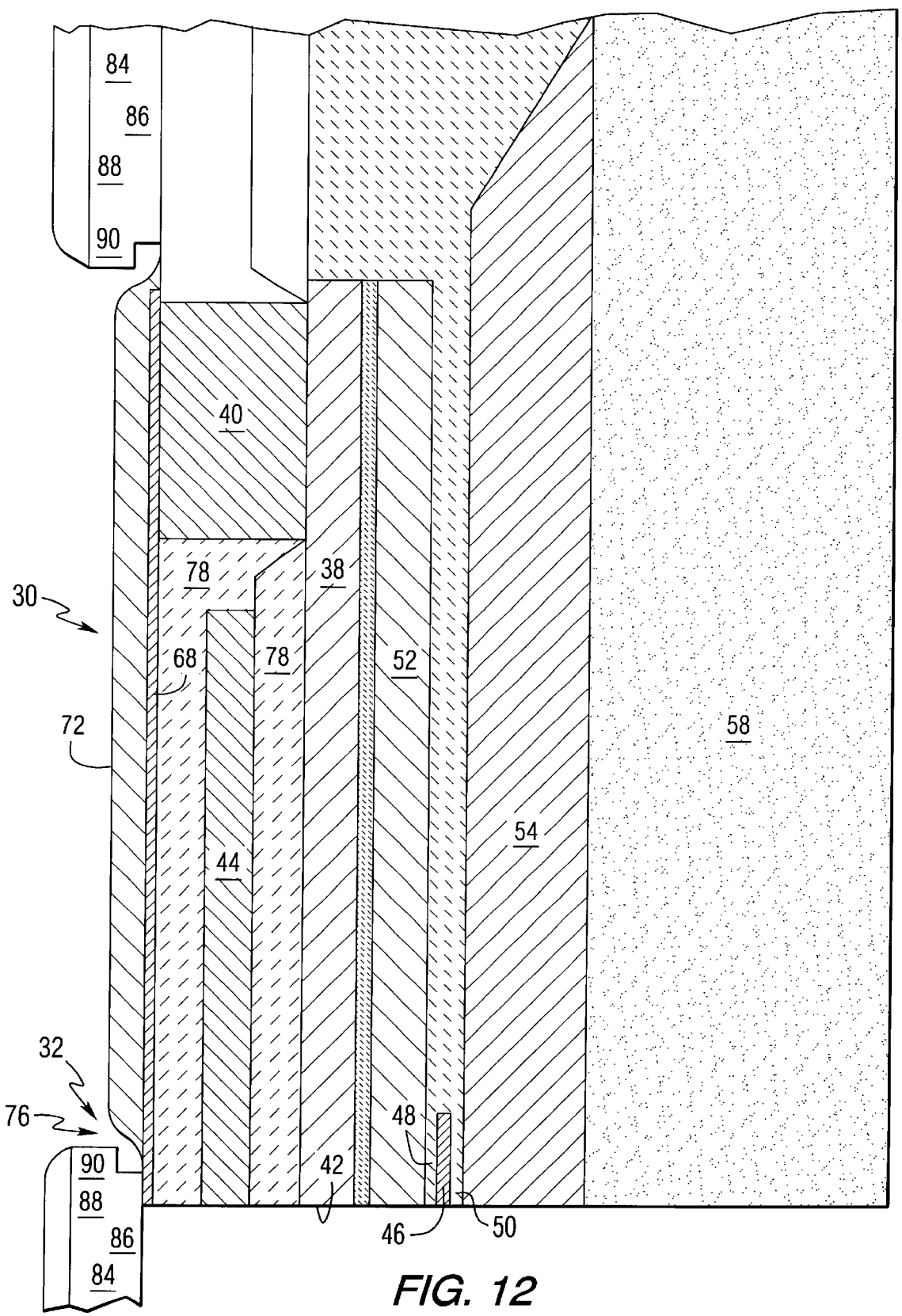
FIG. 12 is a side cross-sectional view of a substrate, read element and associated shields, flux return pole, yoke, coil, high moment main pole material, and material for the low moment portion of the main pole for a recording head according to the present invention.

Referring to FIG. 9, a layer of photoresist 82 has been deposited on a first layer 68, permitting the removal by ion milling of the excess material from the first layer 68 illustrated in FIG. 10. Next, a bi-layer photoresist is applied at each end of the first layer 68, thereby defining the shape and location of the eventual second layer 72. The bi-layer photoresist 84 of the FIG. 11 includes a first photoresist layer 86 and a second photoresist layer 88, with each of the layers 86, 88 having different qualities, thereby enabling the upper layer 88 to extend beyond the edge of the lower layer 86. The resulting overhang 90 of the upper layer 88 will cause the second layer 72 to be deposited forming a tapered portion 76 at the main poles' tip 32, as illustrated in FIG. 12. Upon removal of the photoresist 84, the final recording head 22 will have the structure of FIG. 3.

Figure 13:
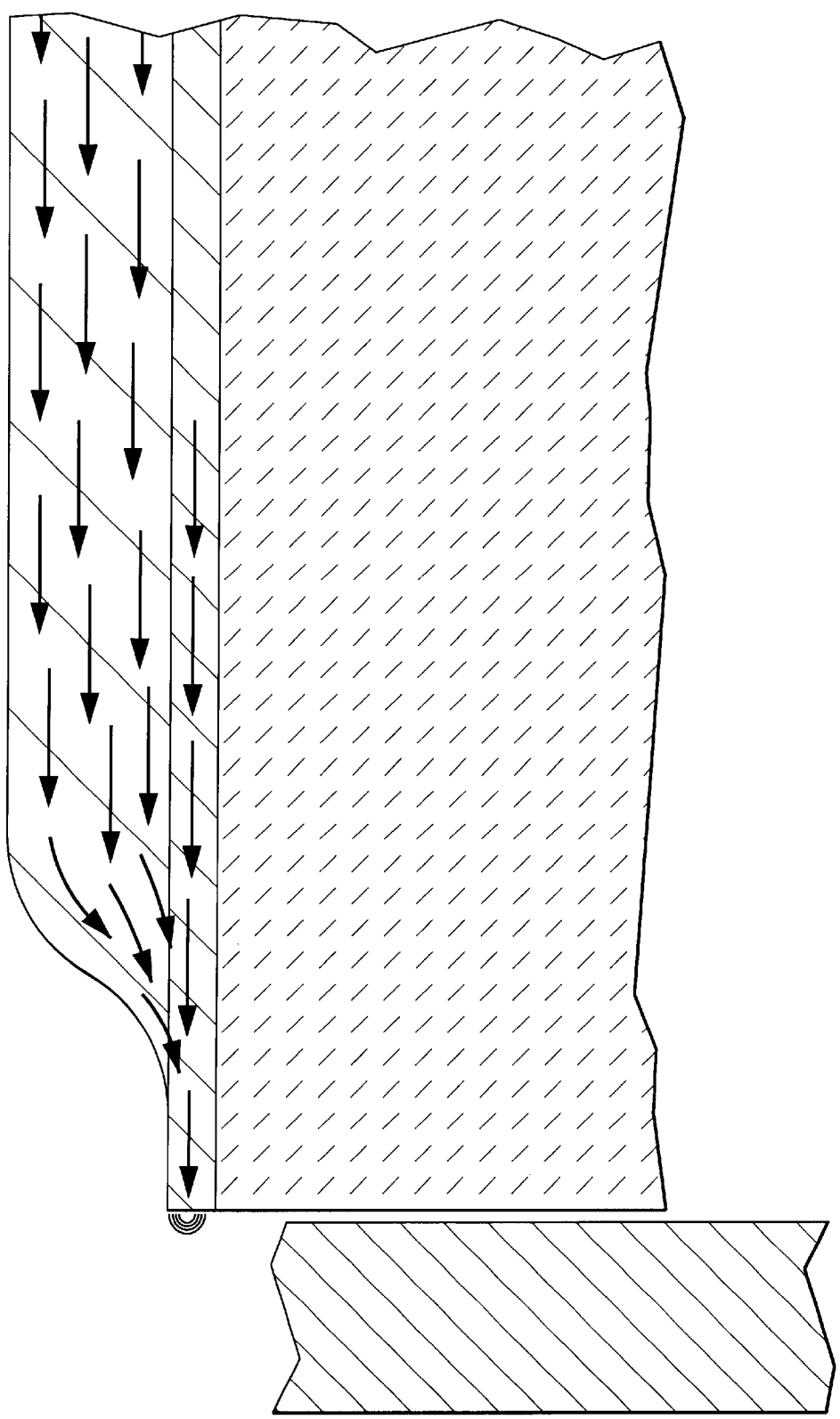
FIG. 13 is a side view of a main pole tip and magnetic storage medium for a recording apparatus according to the present invention.

Writing to the magnetic storage medium 16 is best explained referring to FIGS. 2 and 13. The disc 16 is rotated relative to the recording head 22 so that the recording head 22 is located above the appropriate sectors of the track 62. As recording progresses, the disc 16 will move past the recording head 22. Current will be supplied to the coil 44, thereby inducing a magnetic field within the main pole 30. As a resulting magnetic flux will pass through both the first layers 68 and second layer 72 of the main pole 30, being focused entirely into the first layer 68 at the tip 32. As a domain within a sector of the track 62 passes under the main pole 30, the orientation of its magnetic field will correspond to the orientation of the magnetic field of the main pole 30. As the main pole 30 passes over the disc 16, the direction of current passing through the coil 44 will remain constant when a binary "0" is being recorded, thereby creating consistent orientations of the magnetic fields within the track 62. The current passing through the coil 44 will reverse directions when a binary "1" is being recorded, thereby changing the orientation of a magnetic domain within the tracks 62.

Reading from the magnetic storage medium 16 is accomplished by passing the magnetic storage medium 16 under the recording head 22 so that a track 62 of the storage medium 16 passes under the read element 46. The domain of the track 62 directly under the read element 46 will be read. The magnetic fields within the track 62 directly underneath the read element 46 will be oriented either up or down. Depending on the type of read element 46 used, the magnetizations within at least some of the ferromagnetic layers will rotate to correspond to the magnetizations within the domain of the track 62 currently being read. The magnetizations within the layers of the read element will therefore be oriented either parallel (corresponding to minimum resistance) or anti-parallel (corresponding to maximum resistance). A sensed current is applied to test the resistance of the read element 46. A constant level of resistance, regardless of whether that level of resistance is the minimum or maximum level, is interpreted as a binary "0." Similarly, a change in the level of resistance from the minimum to maximum, or from maximum to minimum, is read as a binary "1."

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A perpendicular recording head for use with magnetic storage media, said perpendicular recording head comprising:

a main pole comprising a first layer of material having a saturation magnetic moment, and a second layer of material deposited on said first layer having a lower saturation magnetic moment than said saturation magnetic moment of said first layer; and means for focusing magnetic flux into the first layer from the second layer and concentrating magnetic flux from said main pole onto a small surface area of a magnetic recording medium.

2. A perpendicular recording head for use with magnetic storage media, said perpendicular recording head comprising:

a main pole having a tip, said main pole including:

a first layer of material extending to the pole tip having a saturation magnetic moment;

a second layer of material adjacent said first layer terminating prior to the pole tip having a lower saturation magnetic moment than said saturation magnetic moment of said first layer, said second layer of material tapering towards said tip in a direction perpendicular to a plane defined by the first layer.

3. The perpendicular recording head according to claim 2, wherein:

said perpendicular recording head further comprises a flux return pole and a yoke, said yoke forming a magnetic coupling between said flux return pole and said main pole; and said main pole's first layer is adjacent to said yoke.

4. The perpendicular recording head according to claim 2, wherein said first layer defines a leading edge of said main pole.

5. A perpendicular recording head according to claim 2, wherein said second layer comprises alloys of CoZrNb, CoZrTa, NiFe, or combinations thereof.

6. A perpendicular recording head according to claim 2, wherein said second layer has a saturation magnetic field not exceeding approximately 16 kG.

7. A perpendicular recording head according to claim 2, wherein said first layer comprises alloys of FeAlN, FeTaN, CoFe, CoFeNi, or combinations thereof.

8. A perpendicular recording head according to claim 2, wherein said first layer has a saturation magnetic field of at least approximately 16 kG.

9. A perpendicular recording head according to claim 8, wherein said first layer has a saturation magnetic field of at least approximately 20 kG.

10. A perpendicular recording head according to claim 2, wherein said main pole has a width less than approximately 0.10 mm.

11. A perpendicular recording head according to claim 2, wherein said main pole has a thickness ranging from approximately 20 A to approximately 5 m.

12. A perpendicular recording head according to claim 11, wherein said main pole has a thickness ranging from approximately 1,000 A to approximately 2,000 A.

13. The perpendicular recording head according to claim 1, wherein the means for focusing magnetic flux comprises the first layer of material extended to a tip of the main pole and the second layer of material terminated prior to the tip of the main pole.

14. The perpendicular recording head according to claim 1, wherein the second layer of material tapers toward a tip of the main pole.

15. The perpendicular recording head according to claim 14, wherein the second layer of material tapers toward the tip in a direction perpendicular to a plane defined by the first layer.

* * * * *

UNITED STATES PATENT AND TRADEMARK OFFICE
CERTIFICATE OF CORRECTION

PATENT NO.   : 6,693,768 B1
DATED        : February 17, 2004
INVENTOR(S)  : Billy Wayne Crue et al.

It is certified that error appears in the above-identified patent and that said Letters Patent is hereby corrected as shown below:

Title page,
Item [56], References Cited, OTHER PUBLICATIONS,
"S.K. Khizroev et al." reference, "Gbit/in$_2$" should read -- Gbit/in$^2$ --.

Column 10,
Line 3, "5 m" should read -- 5µm --.

Signed and Sealed this

Thirtieth Day of May, 2006

JON W. DUDAS
*Director of the United States Patent and Trademark Office*

UNITED STATES PATENT AND TRADEMARK OFFICE
CERTIFICATE OF CORRECTION

PATENT NO. : 6,693,768 B1 Page 1 of 1
APPLICATION NO. : 09/809118
DATED : February 17, 2004
INVENTOR(S) : Billy Wayne Crue et al.

It is certified that error appears in the above-identified patent and that said Letters Patent is hereby corrected as shown below:

On Title Page Item (56)
Other Publications, S.K. Khizroev et al.
"$Gbit/in_2$" should read -- $Gbit/in^2$ --

Column 10, Line 3 (Claim 11)
"5 m" should read -- 5μm --

Signed and Sealed this

Fourteenth Day of November, 2006

JON W. DUDAS
*Director of the United States Patent and Trademark Office*